US010457220B2

(12) United States Patent
Sanchez

(10) Patent No.: US 10,457,220 B2
(45) Date of Patent: Oct. 29, 2019

(54) FLOORBOARD STORAGE COMPARTMENT

(71) Applicant: Anthony & Kimberlee Sanchez Family Trust, Pleasanton, CA (US)

(72) Inventor: Anthony J. Sanchez, Pleasanton, CA (US)

(73) Assignee: Anthony & Kimberlee Sanchez Family Trust, Pleasanton, CA (US)

( * ) Notice: Subject to any disclaimer, the term of this patent is extended or adjusted under 35 U.S.C. 154(b) by 0 days.

(21) Appl. No.: 16/283,755

(22) Filed: Feb. 23, 2019

(65) Prior Publication Data

US 2019/0184903 A1   Jun. 20, 2019

(51) Int. Cl.
*B60R 7/04* (2006.01)
*B60N 3/04* (2006.01)
*B60R 7/08* (2006.01)

(52) U.S. Cl.
CPC .............. *B60R 7/04* (2013.01); *B60N 3/048* (2013.01); *B60R 7/087* (2013.01)

(58) Field of Classification Search
CPC ........... B60R 7/04; B60R 7/087; B60N 3/048; B60N 3/06; B60N 3/04

USPC ............ 296/37.14, 37.8, 75, 97.23; 224/539, 224/544, 542

See application file for complete search history.

(56) References Cited

U.S. PATENT DOCUMENTS

| 4,280,729 A * | 7/1981 | Morawski | B60N 3/044 15/215 |
| 4,420,180 A * | 12/1983 | Dupont | B60N 3/044 15/215 |
| 6,534,146 B1 * | 3/2003 | Mentz, Jr. | B60N 3/044 15/215 |
| 2009/0174224 A1 * | 7/2009 | Takakura | B29C 44/0469 296/193.07 |
| 2016/0284149 A1 * | 9/2016 | Espig | G07C 9/00896 |
| 2017/0203679 A1 * | 7/2017 | Bouchard | B60N 3/048 |
| 2017/0291733 A1 * | 10/2017 | Henderson | B65D 11/1833 |
| 2018/0015862 A1 * | 1/2018 | Chavez Martinez | B60N 3/048 |
| 2019/0009731 A1 * | 1/2019 | Salazar Loera | B60R 11/00 |

* cited by examiner

*Primary Examiner* — Jason S Morrow
(74) *Attorney, Agent, or Firm* — Gerald R. Prettyman

(57) ABSTRACT

A floorboard storage compartment may be placed on top of a floorboard basin of an automobile to conceal contents within an inner compartment composing a lower tray and an upper tray.

25 Claims, 8 Drawing Sheets

FLOORBOARD STORAGE COMPARTMENT

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

Field of Invention

The invention relates generally to the field of storage against theft and more specifically to a storage compartment suitable for automotive use.

Description of Related Art

Portable technology has advanced and encouraged people to communicate, engage in business, and enhance entertainment. Portable technology has also encouraged people to travel with their technology. The relative high value of this technology, however, and its ease of conversion to cash, has also encouraged portable technology theft, aided by the disadvantage that some technology, notably laptop computers, are not as easy to keep out of sight as smaller portable technology. Consequently, the crime of breaking automobile windows for theft has increased.

SUMMARY OF THE INVENTION

Disclosed is a floorboard storage compartment (100) which may be used on top of a floorboard basin (A) of an automobile for an least one concealed valuable (315) within an inner compartment (240) comprising a lower tray (105) and an upper tray (150).

The lower tray (105) comprises a lower tray bottom outer surface (110) which lies on top of the floorboard basin (A), a lower tray front side (115) which lies parallel to a lower portion of a firewall in front and above the floorboard basin (A), a lower tray front side bottom edge (120), a lower tray back edge (125) which extends the floorboard storage compartment (100) to a passenger seat opposite the firewall, a lower tray left side (130) along a transmission hump, a lower tray left bottom edge (135), a lower tray right bottom edge (140), and a lower tray right side (145) which aligns with a passenger side door-jam alongside the floorboard basin (A).

The upper tray (150) comprises an upper tray front side (155) which may be affixed to the lower tray front side (115), an upper tray left side (165) which has a upper tray left upper edge (335), an upper tray right side (170) which has a upper tray right upper edge (340), an upper tray outer surface (180), and an upper tray back edge (175).

The upper tray (150) lifts angularly above the lower tray (105) and may have a hinge line (185) between the upper tray left upper edge (335) and the upper tray right upper edge (340) allowing an upper tray lifting portion (320) of the upper tray (150) to lift angularly above the lower tray (105) from along the hinge line (185).

Bordering the inner compartment (240) are a lower tray back edge (125), the lower tray front side (115), a lower tray left side inner surface (250), and a lower tray right side inner surface (255). An at least one separation support (230) within the inner compartment (240) support and levelly separates the upper tray (150) above a lower tray inner bottom surface (245) between the lower tray front side bottom edge (120) and the lower tray back edge (125).

The inner compartment (240) may include one or more of a plurality of the at least one separation support (230), and a lower tray inner bottom surface (245) which may comprise a slip—mitigating surface (260), a vibration absorbing material (265), a matrix of padded squares arranged in a square grid pattern (270), and an at least one affixable divider (275).

To provide concealment, the upper tray (150) may fit within the lower tray (105) such that the lower tray left upper edge (325) may extend above the upper tray left upper edge (335) and the lower tray right upper edge (330) may extend above the upper tray right upper edge (340).

To provide protection from the weather elements, the upper tray (150) may comprise one or more of a waterproof and wear resistant material (205), a plurality of channels and grooves (215), an upper tray left side trough (220), and an upper tray right side trough (225) to direct dripping fluids into a fluid well (210), and an upper tray stiff support material (305).

DETAILED DESCRIPTION OF THE INVENTION

The floorboard storage compartment (100) when in use, rests on the floorboard basin (A), bordered towards the front of the vehicle by the firewall lower portion (D) bordering an engine compartment (as in a front-engine vehicle), and—towards the rear of the vehicle—by the floorboard rear side (E) in front of the passenger seat (F). To the left of the floorboard storage compartment (100) is the floorboard left side (B), which in a typical front-engine passenger vehicle often abuts against a transmission hump. To the right of the floorboard storage compartment (100) is the floorboard right side (C) which typically abuts against a passenger side door frame.

Figure 1:
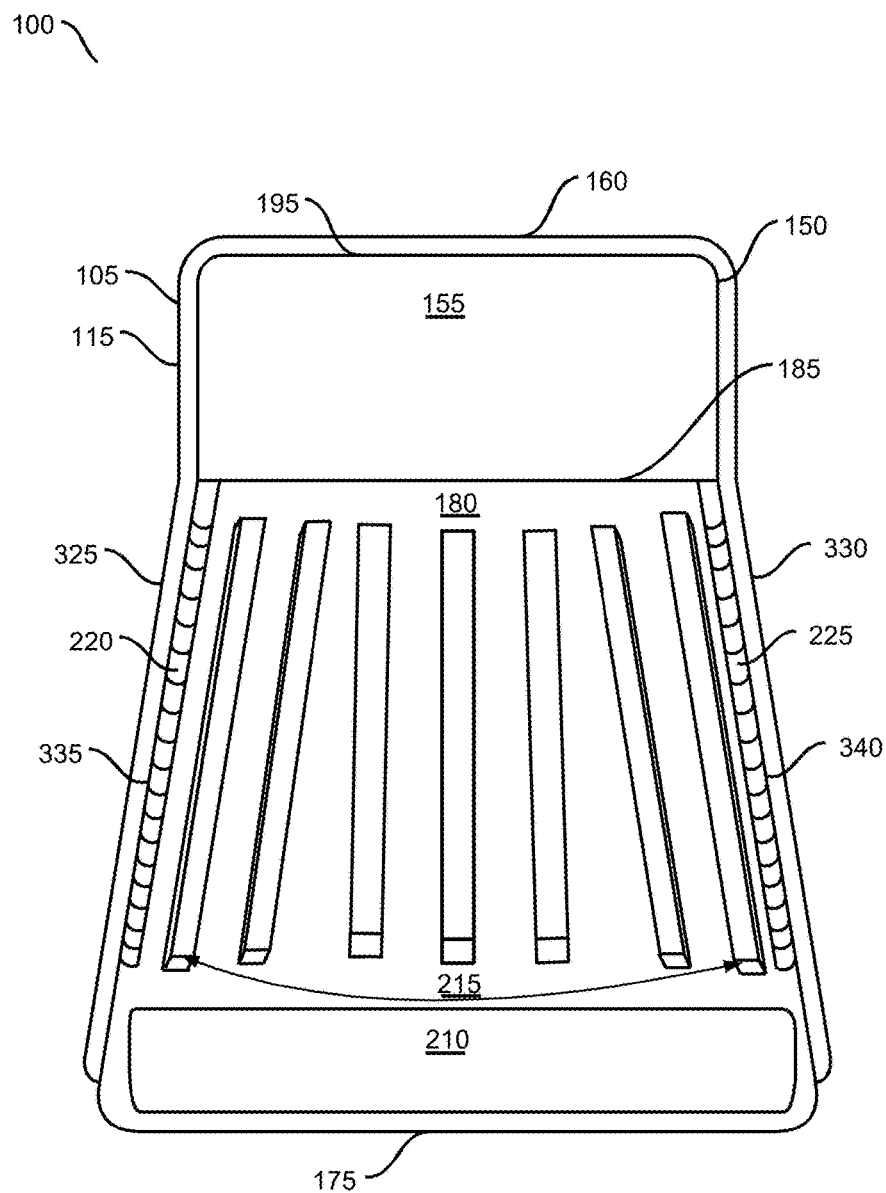
FIG. 1 shows a closed top perspective view of a floorboard storage compartment (100).

FIG. 1 shows a closed top perspective view of a floorboard storage compartment (100).

Shown in FIG. 1 are the closed floorboard storage compartment (100), a lower tray (105), a lower tray front side (115), an upper tray front side (155), a lower tray front side terminal edge (160), an upper tray back edge (175), an upper tray outer surface (180), a hinge line (185), an upper tray front side terminal edge (195), a fluid well (210), a plurality of channels and grooves (215), an upper tray left side trough (220), an upper tray right side trough (225), a lower tray left upper edge (325), a lower tray right upper edge (330), an upper tray left upper edge (335), and an upper tray right upper edge (340).

The lower tray (105) provides a support base for the inner compartment (240) and the upper tray (150). As such, the lower tray (105) may be made or formed from any material capable of supporting the inner compartment (240), the upper tray (150) and an at least one concealed valuable (315).

The lower tray (105) may be made or formed of metal, wood, plastic, or a composite of two of these, or a composite of all three. Demonstration models of the lower tray (105) could be made heavy paper products, such as cardstock or cardboard.

In the closed position, the inner compartment (240) is under the upper tray (150) and thus not in view. The lower tray (105) may slightly protrude around the upper tray (150) with the lower tray front side (115) protruding at the lower tray front side terminal edge (160) against the firewall lower portion (D). Also in view, may be the lower tray left upper edge (325) and the lower tray right upper edge (330), which may protrude above the upper tray left upper edge (335), and the upper tray right upper edge (340) respectively.

When the floorboard storage compartment (100) is in place on the floorboard, the upper tray (150) is primarily in view. As the floorboard storage compartment (100) is intended for concealing small personal items from theft, the upper tray (150) appears to be, and may be used as, an automotive floorboard floor mat.

The upper tray (150) may have an upper tray front side (155) resting against the firewall lower portion (D), albeit with the lower tray front side (115) between the firewall lower portion (I)) and the upper tray front side (155). An upper tray front side terminal edge (195) may be slightly below the lower tray front side terminal edge (160).

The upper tray (150) may have structures in and near an upper tray outer surface (180) for protecting the floorboard basis (A) from water and other outside matter. The upper tray outer surface (180) may comprise a vinyl polymer. The structures may include a fluid well (210), a plurality of channels and grooves (215), an upper tray left side trough (220), and an upper tray right side trough (225). Located near the upper tray back edge (175), the fluid well (210) retains water and other outside matter. Located along the lower tray left upper edge (325) and the lower tray right upper edge (330), the upper tray left side trough (220), and the upper tray right side trough (225), respectively, direct water and other outside materials towards the fluid well (210), as do the plurality of channels and grooves (215), which are generally centered on the upper tray (150).

To assure these structures encounter water and other matter from outside the vehicle without leakage or damage, these structures may be made or formed from any material capable encountering water and other outside matter without damage. In general, the material may be one or more of water-resistant, water-proof, wear resistant, and damage-resistant. These materials may be metal, wood, plastic, a natural material, a composite of two of these, a composite of three of these, or a composite of all four. The upper tray (150) may be made or formed of rubber, vinyl, or polyvinyl chloride.

Also present on the upper tray may be a hinge line (185). The hinge line (185) runs across the upper tray (150) to allow the upper tray (150) to lift relative to the lower tray (105). The hinge line (185) may demarcate the upper tray front side (155) from the upper tray outer surface (180).

The hinge line (185) may be a 'living' hinge, i.e., made by (a) flexing the upper tray (if made from certain plastics) along the hinge line (185) immediately after forming, (b) partially thinning the upper tray (if made from vinyl or rubber) along the hinge line (185), (c) cutting a series of close, narrow, parallel lines in the upper tray along hinge line (185), or any method of allowing the upper tray (150) to lift relative to the lower tray (105).

The hinge line (185) may be a hinge comprised of a leaf affixed to the upper tray (150) with another leaf affixed to the lower tray (105), and a knuckle and pin connecting the two leaves. The hinge line (185) may be one or more integrated straps affixing the lower tray (105) to the upper tray (150). Any form of one or more hinge line (185) may be used to allow the upper tray lifting portion (320) of the upper tray (150) to lift angularly above the lower tray (105).

Figure 2:
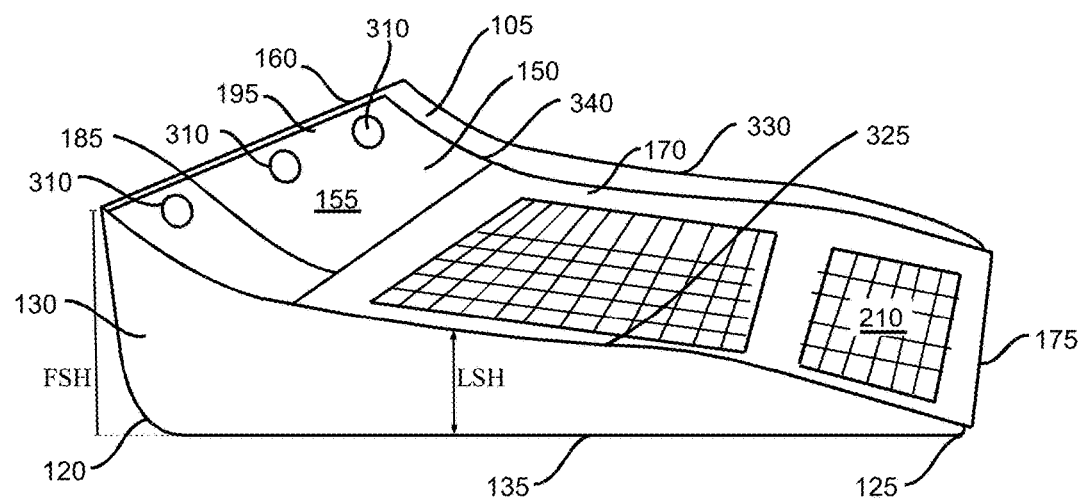
FIG. 2 shows closed left perspective view of a floorboard storage compartment (100).

FIG. 2 shows closed left perspective view of a floorboard storage compartment (100).

Shown in FIG. 2 are the closed floorboard storage compartment (100), a lower tray (105), a lower tray front side bottom edge (120), a lower tray back edge (125), a lower tray left side (130), a lower tray left bottom edge (135), an upper tray (150), an upper tray front side (155), a lower tray front side terminal edge (160), an upper tray right side (170), an upper tray back edge (175), an upper tray outer surface (180), a fluid well (210), a one or more tray affixments (310), a lower tray left upper edge (325), a lower tray right upper edge (330), an upper tray right upper edge (340), a lower tray front side height (FSH), and a lower tray left side height (LSH).

The upper tray front side (155) may project generally parallel to the lower tray front side (115) (which is hidden in this view except for the lower tray front side terminal edge (160). To aid in concealing that the floorboard storage compartment is more than a floor mat, the upper tray front side (155) may lie parallel to within one-half inch to the lower tray front side (115).

Also shown in FIG. 2 is a lower tray front side bottom edge (120) at the bottom of the lower tray front side (115), and from which projects a lower tray front side height (FSH) to the lower tray front side terminal edge (160). The lower tray front side height (FSH) may range in height from two inches to less than six inches, so that the lower tray front side (115) rises sufficiently to attach to the upper tray front side (155) with the one or more tray affixments (310) attached the upper tray front side (155) to the lower tray front side (115).

The one or more tray affixments (310) may be one or more rivets, in particularly, a type of rivet known as a mushroom rivet, or plug rivet. Such rivets are advantageous for their ease of affixment, and if made from plastic, are non-corroding.

The one or more tray affixments (310) may be a hinge comprised of a leaf affixed to the upper tray (150) with another leaf affixed to the lower tray (105), and a knuckle and pin connecting the two leaves. The one or more tray affixments (310) may be one or more integrated straps affixing the lower tray (105) to the upper tray (150). Any form of one or more tray affixments (310) may be used.

A lower tray left side (130) runs from the lower tray front side bottom edge (120) along the lower tray left bottom edge (135) to the lower tray back edge (125) and then back along the lower tray left upper edge (325) to the lower tray front side terminal edge (160). As shown in FIG. 2, the lower tray left side (130) has a lower tray left side height (LSH) higher at the lower tray front side terminal edge (160) than at the lower tray back edge (125). When a floorboard storage compartment (100) is placed on the floorboard basin (A), the lower tray left side (130) aligns along the floorboard left side (B) and may be have lateral profile, i.e., alignment, position relative to, to lie parallel to a transmission hump (B) adjacent to the floorboard left side (B).

The lower tray left side (130) may have a profile parallel to the lower tray left bottom edge (135), indicated by lower tray left side height (LSH), which when viewed from the left side as shown in FIG. 2, may be curvilinear, i.e., comprised of curved lines. The lower tray left side (130) may have a profile parallel to the lower tray left bottom edge (135), indicated by lower tray left side height (LSH), which is linear. The lower tray left side (130) may have a height relative to the lower tray left bottom edge (135), indicated by lower tray left side height (LSH), which is curvilinear in part, and linear in part. The lower tray left side height (LSH) at the lower tray front side (115) may be at least one inch but less than five inches.

The lower tray right side (145) may have a profile parallel to the lower tray right bottom edge (140), and the lower tray right upper edge (330) may have a profile parallel to the lower tray right side (145).

Similarly shown on the right side of the lower tray (105) is the lower tray right upper edge (330). As with the lower tray left side (130), the lower tray right upper edge (330) may have a curvilinear profile, a linear profile, or a combination curvilinear—linear profile. Of importance is the location of the floorboard right side (C) and height of the passenger door frame in relation to the right side of the lower tray (105). If the floorboard right side (C) and passenger door frame are immediately adjacent and low, the lower tray right upper edge (330) may have a near flat profile, and may be small in height. The lower tray left side (130) and the lower tray right upper edge (330) may have uniquely different profiles.

Also shown in FIG. 2 are the lower tray back edge (125) and an upper tray back edge (175). As shown in FIG. 2, the upper tray back edge (175) extends over the lower tray back edge (125) which aids protecting the at least one concealed valuable (315) within the inner compartment (shown in another drawing), and to aid that the floorboard storage compartment (100) as merely an automotive floor mat.

Also shown in FIG. 2 is an upper tray right side (170), situated, as previously described, below the lower tray right upper edge (330).

Also shown is the hinge line (185), which as shown here, extends from the upper tray right side (170) to the upper tray left side (blocked from view by the lower tray left side (130).

Figure 3:
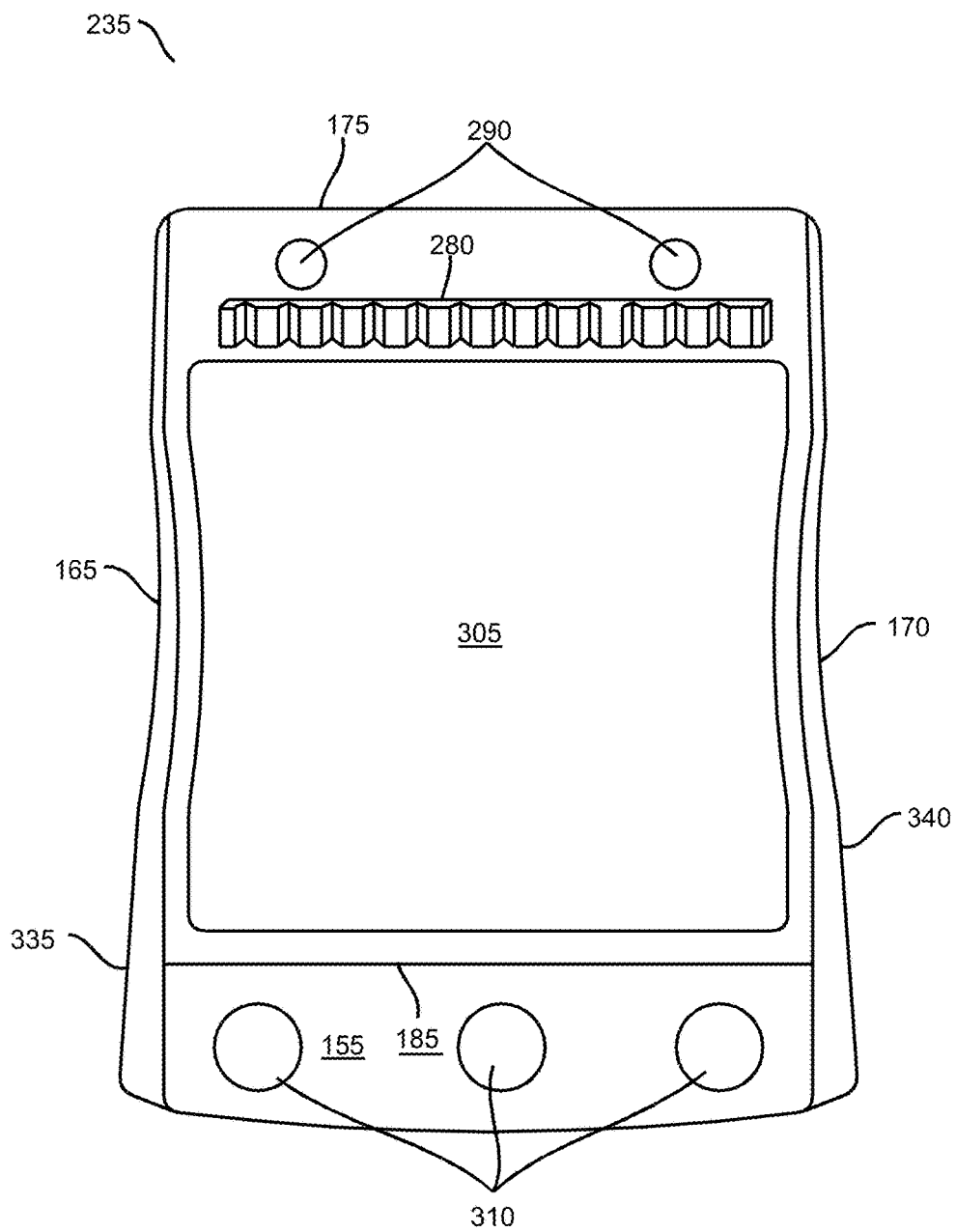
FIG. 3 shows an underside view of an upper tray (150) without a lower tray (105).

FIG. 3 shows an upper tray inner surface (235), which is an underside view of an upper tray (150) without a lower tray (105).

Shown in FIG. 3 are an upper tray front side (155), an upper tray left side (165), an upper tray right side (170), an upper tray back edge (175), a hinge line (185), an upper tray front side terminal edge (195), an upper tray inner surface (235), a plurality of side-by-side ridges (280), an at least two magnets (290), an upper tray stiff support material (305), a one or more tray affixments (310), an upper tray left upper edge (335), and an upper tray right upper edge (340).

As shown in FIG. 3, the upper tray front side terminal edge (195) is at the bottom of the page, with the upper tray back edge (175) at the top of the page. This view places the upper tray left side (165) on the left side of the page, and the upper tray right side (170) on the right side of the page.

Just above the upper tray front side terminal edge (195) is the underside of the upper tray front side (155). A one or more tray affixments (310) may also be present. Just above the underside of the upper tray front side (155) may be a hinge line (185), extending, as previously mentioned, between the upper tray left side (165) on the left side of the page, and the upper tray right side (170) on the right side of the page.

Also shown in FIG. 3 in the mid-section of the upper tray inner surface (235) is an upper tray stiff support material (305). The upper tray stiff support material (305) may extend from the upper tray left side (165) to the upper tray right side (170). When constructed from a stiff support material, the upper tray stiff support material (305) provides stiffness to the upper tray (150), which then adds protection to the contents of the inner compartment (shown in another drawing), and may provide for portability of the floorboard storage compartment (100).

The upper tray stiff support material (305) may be made of metal, wood, plastic, a composite of two of these, a composite of all three, or any material capable of providing stiffness to the upper tray (150). The upper tray stiff support material (305) may be capable of supporting at least 15 pounds.

Shown above the upper tray stiff support material (305) and located near the upper tray back edge (175) are a plurality of side-by-side ridges (280) and an at least two magnets (290). The plurality of side-by-side ridges (280) on the upper tray inner surface (235) provide a stand-off function for the upper tray (150) at the lower tray back edge (125). The plurality of side-by-side ridges (280) may be positioned between one-half inch and four inches from the upper tray back edge (175).

The at least two magnets (290) are affixed to the upper tray inner surface (235) at the upper tray back edge (175) to help center and hold the upper tray (150) in place when the upper tray (150) is closed onto of the lower tray (105), i.e., they magnetically couple to an at least two magnets (290) affixed to the lower tray inner bottom surface (245) at the lower tray back edge (125) to secure closure of the upper tray (150) to the lower tray (105).

Also shown in FIG. 3 is a curved lateral profile of the upper tray left side (165), and the upper tray right side (170) which may be used along with a curved lateral profile of the lower tray left side (130), the lower tray right side (145) to provide an aesthetic appeal to the floorboard storage compartment (100).

Figure 4:
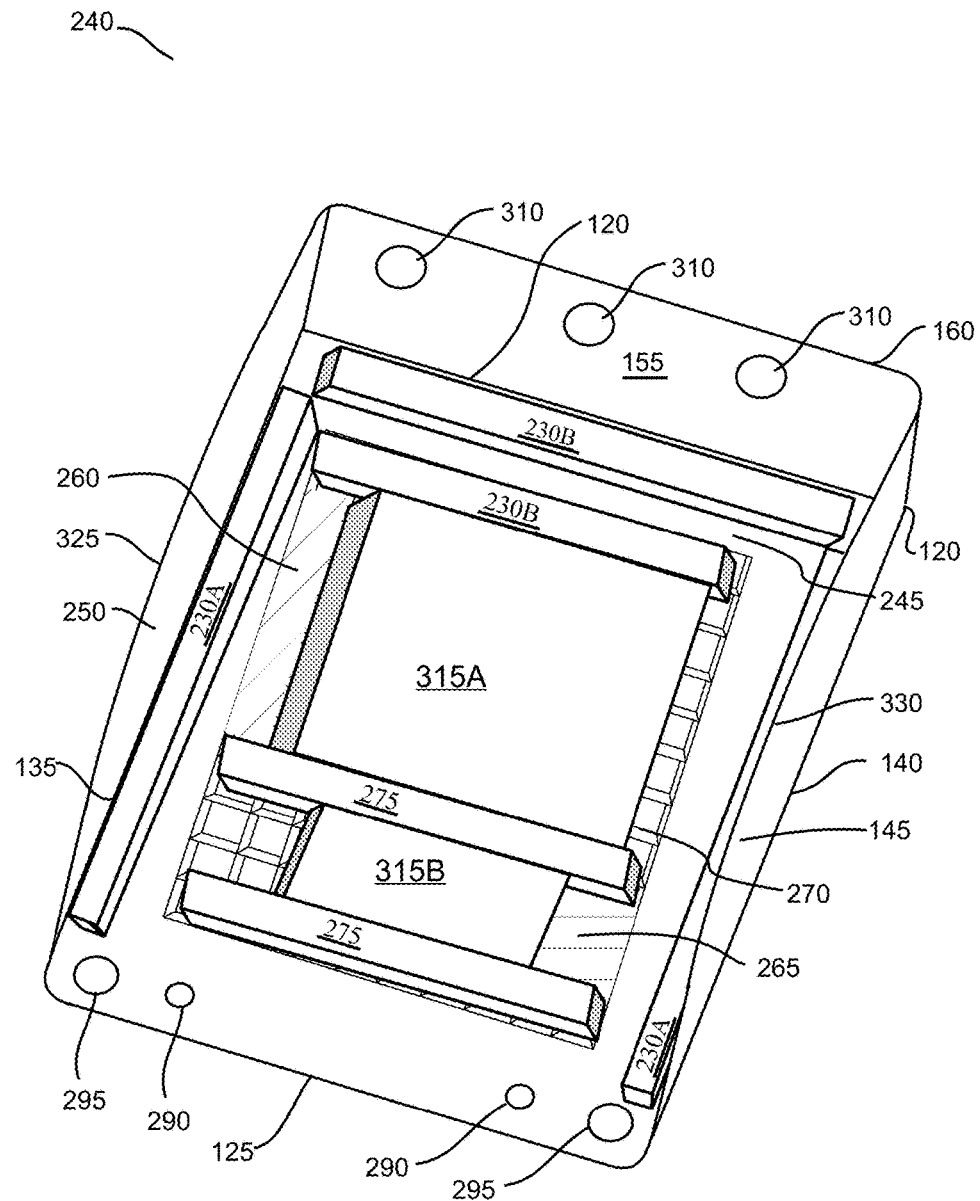
FIG. 4 shows a top perspective view of an inner compartment (240) for an at least one concealed valuable (315) within a lower tray (105) of a floorboard storage compartment (100).

FIG. 4 shows a top perspective view of an inner compartment (240) for an at least one concealed valuable (315) within a lower tray (105) of a floorboard storage compartment (100) and a plurality of the at least one separation support (230).

Shown in FIG. 4 are a lower tray (105), a lower tray front side (115), a lower tray front side bottom edge (120), a lower tray back edge (125), a lower tray left bottom edge (135), a lower tray right bottom edge (140), a lower tray front side terminal edge (160), an at least one separation support (230), an inner compartment (240), a lower tray inner bottom surface (245), a lower tray left side inner surface (250), a lower tray right side inner surface (255), the lower tray inner bottom surface (245) has a matrix of padded squares arranged in a square grid pattern (270), an at least one affixable divider (275) for dividing the inner compartment (240) into a plurality of inner compartments, an at least two magnets (290), an at least one floorboard affixment port (295), a one or more tray affixments (310), a lower tray left upper edge (325), and a lower tray right upper edge (330).

As shown in FIG. 4, the inner compartment (240) lies within the lower tray (105). As shown, the lower tray front side bottom edge (120) of the lower tray front side (115), a lower tray left bottom edge (135) of a lower tray left side inner surface (250), and the lower tray back edge (125) border the inner compartment (240). In addition, a lower tray right bottom edge (140) of the lower tray right side inner surface (255), also borders the inner compartment (240).

A one or more tray affixments (310) on the lower tray front side (115) may serve to affix the upper tray (150, not shown) to the lower tray (105).

Along the lower tray back edge (125), an least one floorboard affixment port (295) may be used to affix the floorboard storage compartment (100) to the floorboard basin (A).

Also the lower tray back edge (125), a set of an at least two magnets (290) may be used to magnetically couple the lower tray (105) to a set of an at least two magnets (290) on the upper tray (150), which are shown in FIG. 3.

Shown along three sides of the inner compartment (240), a plurality (here, three) of an at least one separation support (230), serve to support the upper tray (150) onto the lower tray (105). The an at least one separation support (230) may support and separate the upper tray (150) at a distance of at least one-half inch but not more than five inches above the lower tray inner bottom surface (245).

Within the inner compartment (240), the lower tray inner bottom surface (245) may use various surfaces for safely containing the at least one concealed valuable (315).

The lower tray inner bottom surface (245) may have a matrix of padded squares arranged in a square grid pattern (270) to cushion the at least one concealed valuable (315) from vibration and movement. Additional pieces of the at least one separation support (230) or an at least one affixable divider (275) may be placed on the matrix of padded squares arranged in a square grid pattern (270) for dividing the inner compartment (240) into a plurality of inner compartments and to cushion additional at least one concealed valuable (315). The matrix of padded squares arranged in a square grid pattern (270) may be configured for use an at least one separation support (230) having a portion cut-out along the bottom edges of the an at least one separation support (230) for fitting over the matrix of padded squares arranged in a square grid pattern (270) within an inner compartment (240).

A slip—mitigating surface (260) may be used to lessen movement of the at least one concealed valuable (315) within the inner compartment. The slip—mitigating surface (260) may substitute for the matrix of padded squares arranged in a square grid pattern (270). The slip-mitigating surface (260) may comprise a rough, i.e., friction causing, surface. The slip-mitigating surface (260) may comprise a surface having an adhesion affect.

A vibration absorbing material (265) may be used to lessen vibration transfer to the at least one concealed valuable (315) within the inner compartment. The vibration absorbing material (265) may substitute for the matrix of padded squares arranged in a square grid pattern (270). The vibration absorbing material (265) may comprise a compressible material formed into a matrix of padded squares arranged in a square grid pattern (270) on the lower tray inner bottom surface (245). The vibration absorbing material (265) may comprise materials comprising air trapped within a material, or bonded to the material, including but not limited to bubble packing ('wrap'), polystyrene-foam, polyurethane foam, ethylene-vinyl acetate (EVA) foam, copolymers of ethylene and vinyl acetate, i.e., polyethylene-vinyl acetate (PEVA), low-density polyethylene (LDPE) foam, polyethylene (PE), nitrile rubber (NBR) foam, copolymers of acrylonitrile (ACN) and butadiene, polychloroprene foam ('neoprene'), etc.

The lower tray inner bottom surface (245) may comprise a scratch minimizing surface, such as cloth, a plastic, an elastomer, or any scratch minimizing surface.

Figure 5:
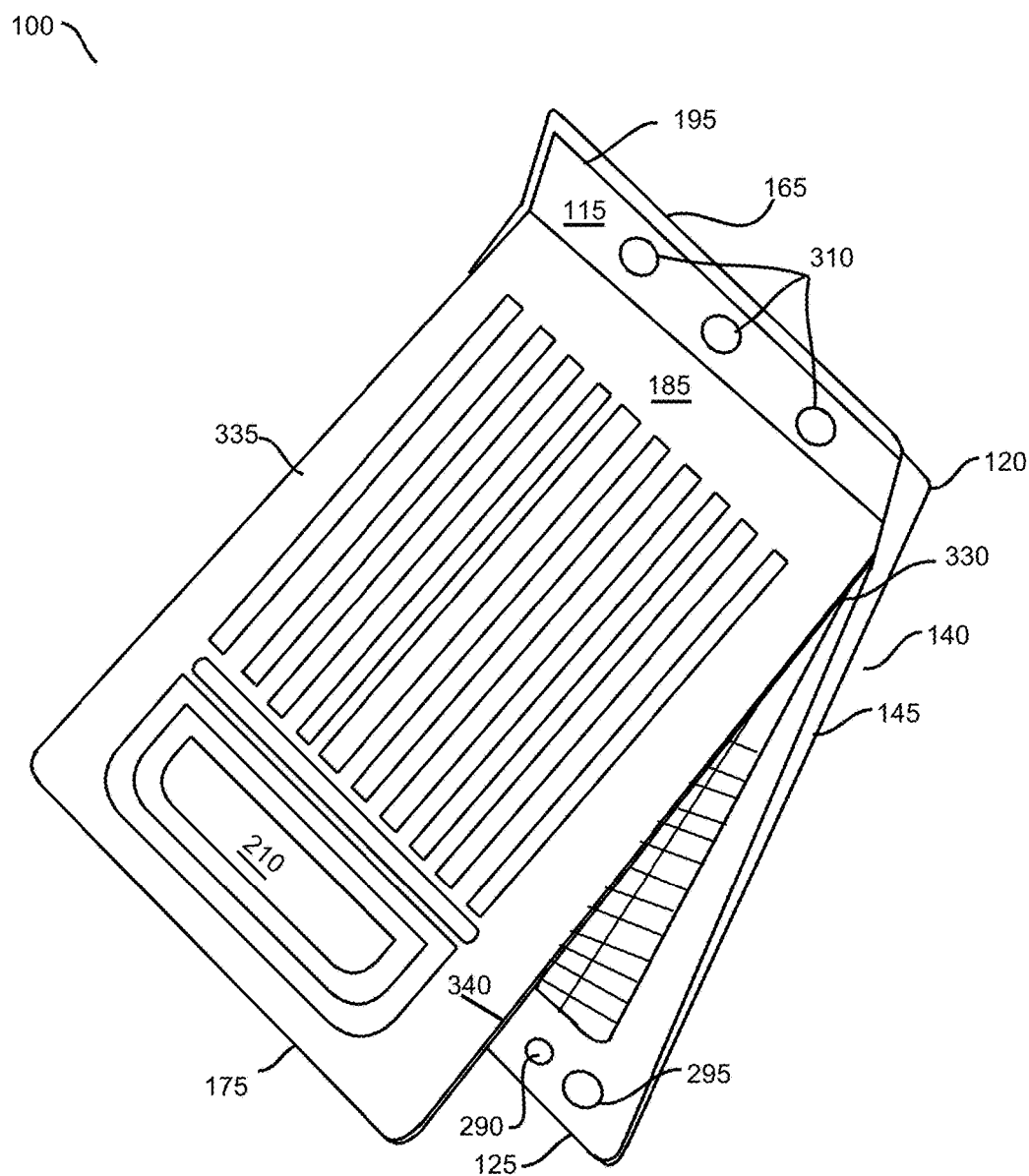
FIG. 5 shows a partially open right perspective view of a floorboard storage compartment (100).

FIG. 5 shows a partially open right perspective view of a floorboard storage compartment (100).

Shown in FIG. 5 are a floorboard storage compartment (100), a lower tray front side (115), a lower tray front side bottom edge (120), a lower tray back edge (125), a lower tray right bottom edge (140), a lower tray right side (145), an upper tray front side (155), an upper tray right side (170), an upper tray back edge (175), an upper tray outer surface (180), a hinge line (185), an upper tray right side trough (225), an at least two magnets (290), an least one floorboard affixment port (295), a one or more tray affixments (310), an at least one concealed valuable (315), an upper tray lifting portion (320), an upper tray left upper edge (335), and an upper tray right upper edge (340).

As shown in FIG. 5, the upper tray (150) has a upper tray lifting portion (320), which lifts angularly above the lower tray (105) along the hinge line (185), which runs between an upper tray left upper edge (335), and an upper tray right upper edge (340), at the base of an upper tray front side (155).

The upper tray (150) may lift partially, i.e., to an angle in the range of 45 degrees to 60 degrees, which (1) generally provides sufficient clearance for a user to place the at least one concealed valuable (315) within the inner compartment (240), or to remove them, and (2) provides for a sufficient length of the floorboard storage compartment (100) while not causing frustration with a low dashboard.

Similar to as shown FIG. 2, is a right side view of the floorboard storage compartment (100). Near the lower tray front side (115), the lower tray right side (145) has a height higher than the lower tray right side (145) near the lower tray back edge (125). As such, the lower tray right upper edge (330) may have a curvilinear profile, a linear profile, or a combination curvilinear—linear profile along the lower tray right upper edge (330).

Also shown in FIG. 5 is a matrix of padded squares arranged in a square grid pattern (270), which are shown underneath the at least one concealed valuable (315) to cushion the at least one concealed valuable (315) from vibration and movement.

FIG. 5 also shows on the upper tray outer surface (180), a plurality of channels and grooves (215), along with an upper tray left side trough (220), and an upper tray right side trough (225), for directing fluids as might drip from footwear, into a fluid well (210).

Figure 6:
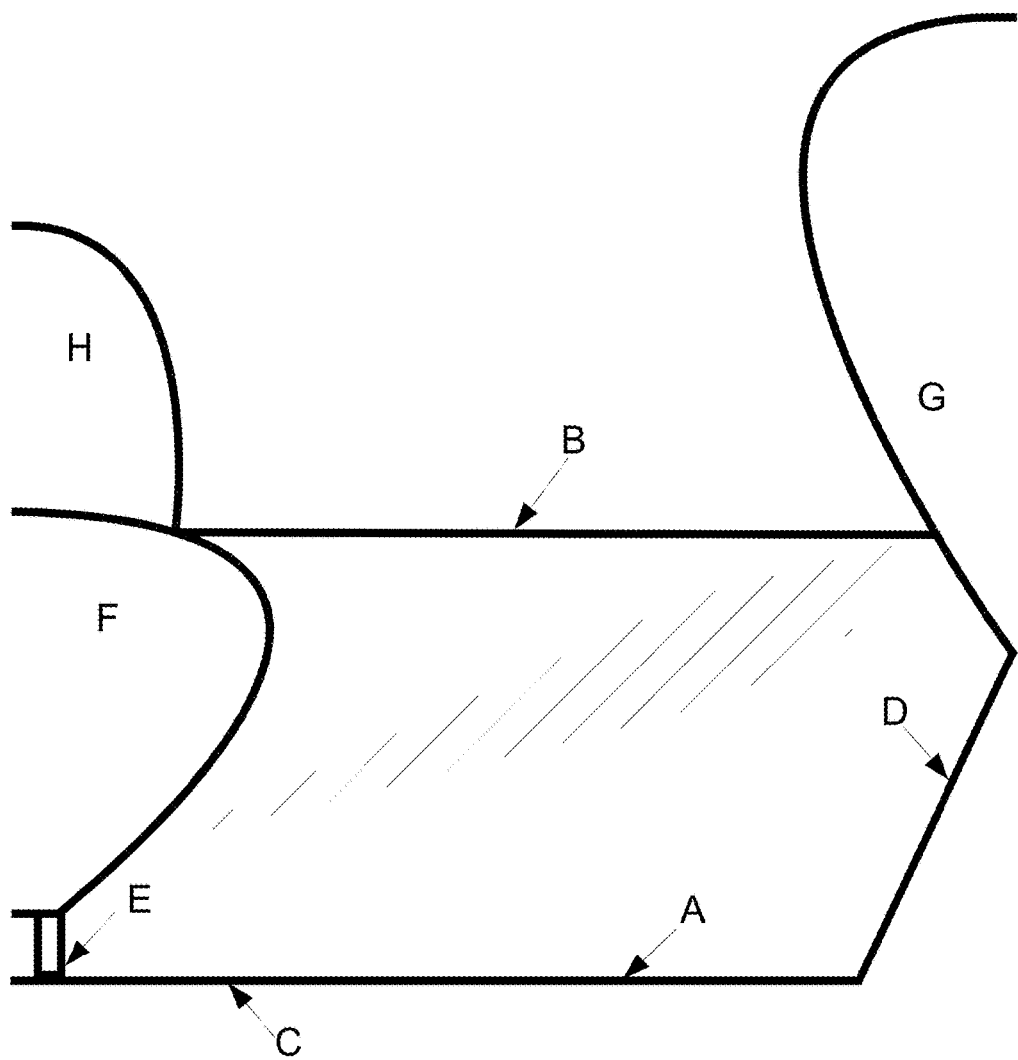
FIG. 6 shows a partial view of an automobile front passenger seat compartment.

FIG. 6 shows a partial view of a front passenger side floorboard in an automobile passenger compartment.

Shown in FIG. 6 are a floorboard basin (A), a floorboard left side (B), a floorboard right side (C), a firewall lower portion (D), a floorboard rear side (E), a passenger seat (F), a dashboard (G), and an inter-seat center console (H).

Different automobiles may vary in the precise spatial positioning of these components.

The front passenger seat compartment floorboard basin A may be lower, i.e., closer to roadway, than the passenger door, which may affect the location of the floorboard right side (C), and thus the profile and height and the lower tray right side (145).

The floorboard left side (B) may borders a center transmission hump, although certain vehicles, particularly, front drive versions, lack a transmission hump. Similarly, some vehicles lack a center console (H) between the front seats.

The firewall lower portion (D) may have a different angle to the front passenger seat compartment floorboard basin (A) which may affect the angle of the lower tray front side (115), the upper tray front side (155), or both.

The dashboard (G) may be lower or higher above the floorboard basin A, which may affect the length of the floorboard storage compartment (100), or the angle to which the upper tray lifting portion (320) lifts relative the lower tray (105).

The dashboard (G) may have a flatter profile. Regardless, FIG. 6 presents a sufficient spatial orientation for use of the floorboard storage compartment (100).

Figure 7:
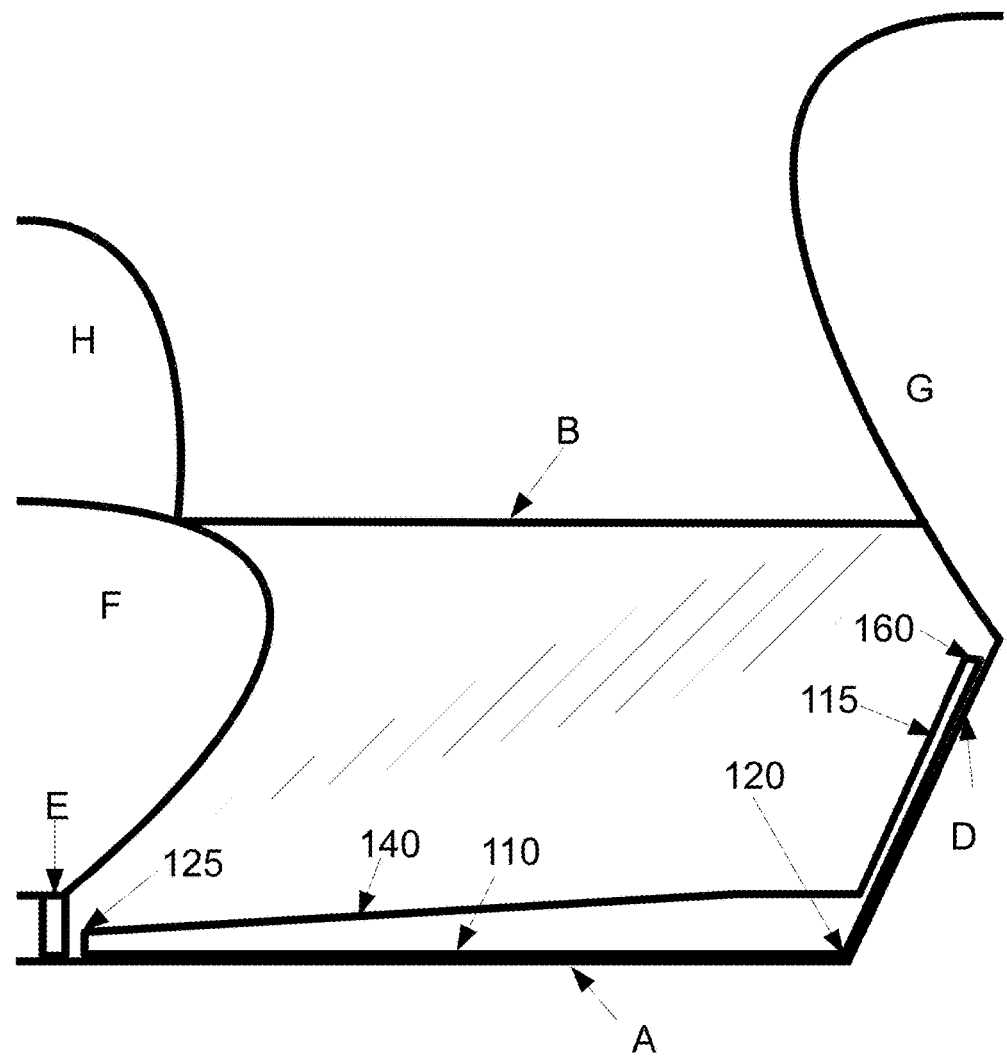
FIG. 7 shows a closed right plan view of a floorboard storage compartment (100) in place within the FIG. 6 partial view of an automobile front passenger seat compartment.

FIG. 7 shows a closed right plan view of a floorboard storage compartment (100) in place within the FIG. 6 partial view of an automobile front passenger seat compartment.

Shown in FIG. 7 are the floorboard storage compartment (100), a lower tray bottom outer surface (110), a lower tray front side (115), a lower tray front side bottom edge (120), a lower tray back edge (125), a lower tray right bottom edge (140), a lower tray front side terminal edge (160), a floorboard basin (A), a floorboard left side (B), a firewall lower portion (D), a floorboard rear side (E), a passenger seat (F), a dashboard (G), and an inter-seat center console (H).

As shown in FIG. 6, the upper tray back edge (175) may extend to within and less than one inch from the floorboard rear side (E) bordered by a passenger seat (F).

Figure 8:
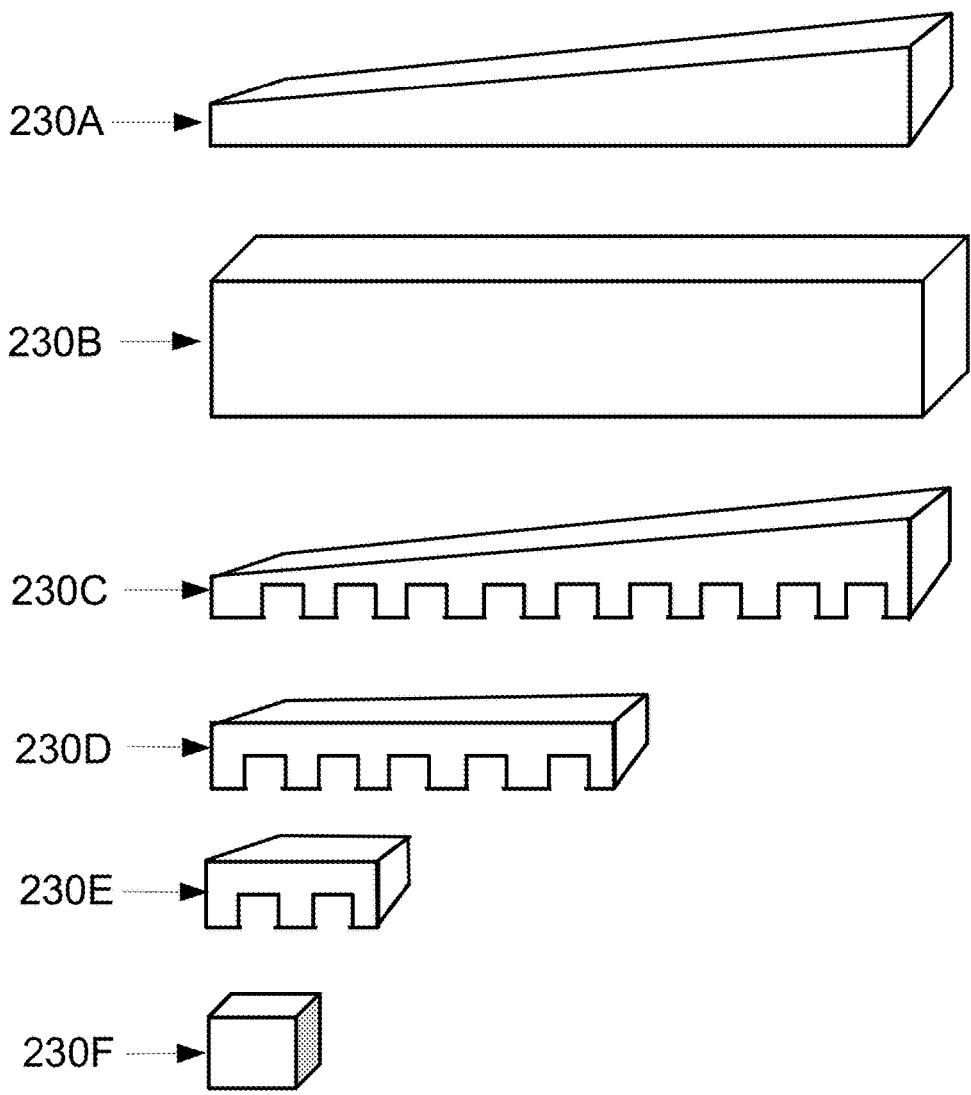
FIG. 8 shows multiple configurations of an at least one separation support (230) with a portion cut-out along the bottom edges for fitting over the matrix of padded squares arranged in a square grid pattern (270) within an inner compartment (240).

FIG. 8 shows multiple configurations of the at least one separation support (230) with a portion cut-out along the bottom edges for fitting over the matrix of padded squares arranged in a square grid pattern (270) within an inner compartment (240).

The at least one separation support (230) serves to (1) support the upper tray (150) above the lower (105), (2) hold an at least one concealed valuable (315) in place in the inner compartment (240), and (3) separate an at least one concealed valuable from contact with any other an at least one concealed valuable an at least one concealed valuable (315). The at least one separation support (230) may also be used as an at least one affixable divider (275) for dividing the inner compartment (240) into a plurality of inner compartments.

An at least one separation support (230A) is an incline plane version with a length to provide for a sloping support of the upper tray (150) above the lower tray (105), as might be used along the lower tray left bottom edge (135) and the lower tray right bottom edge (140).

An at least one separation support (230B) is double height version with a length for use along the front side of the lower tray (105).

An at least one separation support (230C) is an incline plane model with side to side cut-outs for fitting over the matrix of padded squares arranged in a square grid pattern (270).

An at least one separation support (230D) is a flat version with side to side cut-outs for fitting over the matrix of padded squares arranged in a square grid pattern (270).

An at least one separation support (230E) is a shorter flat version with side to side cut-outs for fitting over the matrix of padded squares arranged in a square grid pattern (270) for use to hold an at least one concealed valuable (315) in place in the inner compartment (240), and separate an at least one concealed valuable from contact with any other an at least one concealed valuable an at least one concealed valuable (315).

An at least one separation support 230E is a small flat version without side to side cut-outs for use to support the upper tray (150) above the lower (105) and separate an at least one concealed valuable from contact with any other an at least one concealed valuable an at least one concealed valuable (315).

The one or more tray affixments (310) may be pivotably affixed to the lower tray left upper edge (325) and to the upper tray left upper edge (335) to allow the upper tray (150) pivot angularly from the lower tray left upper edge (325).

The one or more tray affixments (310) may be pivotably affixed to the lower tray right upper edge (330) and to the upper tray right upper edge (340) to allow the upper tray (150) pivot angularly from the lower tray right upper edge (330).

The pivotably affixed one or more tray affixments (310) may be a 'living' hinge. The pivotably affixed one or more tray affixments (310) may be made by (a) flexing the upper tray and lower tray (105) (if made from certain plastics) immediately after forming, (b) partially thinning the upper tray (if made from vinyl or rubber) along the hinge line (185), (c) cutting a series of close, narrow, parallel lines in the upper tray along hinge line (185), or any method of allowing the upper tray (150) to lift relative to the lower tray (105).

The pivotably affixed one or more tray affixments (310) may be a hinge comprised of a leaf affixed to the upper tray (150) with another leaf affixed to the lower tray (105), and a knuckle and pin connecting the two leaves. The pivotably affixed one or more tray affixments (310) may be one or more integrated straps affixing the lower tray (105) to the upper tray (150). Any form of one or more types of pivotably affixed one or more tray affixments (310) may be used.

These descriptions and drawings are embodiments and teachings of the disclosure. All variations are within the spirit and scope of the disclosure. This disclosure is not to be considered as limiting the claims to only the embodiments illustrated or discussed. Certain changes can be made in the subject matter without departing from the spirit and the scope of this invention. Changes are possible within the scope of this invention. Each structure or element recited in any claim also refers to all equivalent structures or elements. The following claims are intended to cover the invention as broadly as possible in whatever form it may be used.

I claim:

1. A floorboard storage compartment (100) for a front passenger side floorboard of a vehicle comprising a floorboard basin (A), a floorboard left side (B), a floorboard right side (C), a firewall lower portion (D) bordering an engine compartment and a floorboard rear side (E) bordered by a passenger seat (F), wherein the floorboard storage compartment (100) comprises:

a lower tray (105) comprising
a lower tray bottom outer surface (110) configured to lie on top of the floorboard basin (A) of an automobile,
a lower tray front side (115) affixed to the lower tray bottom outer surface (110) along a lower tray front side bottom edge (120) with the lower tray front side (115) configured to lie parallel against the firewall lower portion (D) of the automobile and comprising a lower tray front side height (FSH) and comprising a lower tray front side terminal edge (160), a lower tray back edge (125) configured to extend the floorboard storage compartment (100) adjacent to the floorboard rear side (E), a lower tray left side (130) affixed to the lower tray bottom outer surface (110) along a lower tray left bottom edge (135), with the lower tray left side (130) configured to lie adjacent to the floorboard left side (B) and comprising a lower tray left upper edge (325) comprising a lower tray left side height (LSH) at the lower tray front side (115) with the lower tray left side height (LSH) of the lower tray decreasing towards the lower tray back edge (125) such that the lower tray left side height (LSH) is less at the lower tray back edge (125), a lower tray inner bottom surface (245) bordered by the lower tray front side (115), the lower tray left bottom edge (135), the lower tray right bottom edge (140), and the lower tray back edge (125), an upper tray (150) configured to rest on top of an at least one separation support (230) within the lower tray (105) and comprising an upper tray front side (155) configured to lie within one-half inch to the lower tray front side (115), an upper tray left upper edge (335) configured to lie within and below the lower tray left upper edge (325), an upper tray right upper edge (340) configured to lie within and below a lower tray right upper edge (330), an upper tray back edge (175) configured to extend beyond the lower tray back edge (125), an upper tray outer surface (180) comprising a waterproof and wear resistant material (205), a fluid well (210) on top of the an upper tray outer surface (180) configured to retain fluid drips adjacent to the upper tray back edge (175), a plurality of channels and grooves (215) on top of the an upper tray outer surface (180) configured to direct fluid drips into the fluid well (210), an upper tray left side trough (220) extending below and parallel to the upper tray left upper edge (335) from the upper tray front side (155) to the upper tray back edge (175), an upper tray right side trough (225) extending below and parallel to the upper tray right upper edge (340) from the upper tray front side (155) to the upper tray back edge (175), an upper tray lifting portion (320) configured to lift angularly above the lower tray (105), and an inner compartment (240) bordered within the lower tray front side (115), a lower tray left side inner surface (250), a lower tray right side inner surface (255), a lower tray inner bottom surface (245), and configured for an at least one separation support (230) to support and separate the upper tray (150) above the lower tray inner bottom surface (245) between the lower tray front side bottom edge (120) and the lower tray back edge (125).

2. The floorboard storage compartment of claim 1 further comprising a one or more tray affixments (310) to affix the upper tray (150) to the lower tray (105).

3. The floorboard storage compartment (100) of claim 2 wherein the one or more tray affixments (310) comprises a plug rivet.

4. The floorboard storage compartment (100) of claim 1 wherein the lower tray inner bottom surface (245) comprises a slip—mitigating surface (260).

5. The floorboard storage compartment (100) of claim 1 wherein the lower tray inner bottom surface (245) comprises a vibration absorbing material (265).

6. The floorboard storage compartment (100) of claim 5 wherein the vibration absorbing material (265) comprises a compressible material formed into a matrix of padded squares arranged in a square grid pattern (270) on the lower tray inner bottom surface (245).

7. The floorboard storage compartment of (100) claim 1 wherein the lower tray inner bottom surface (245) comprises a scratch minimizing surface.

8. The floorboard storage compartment of (100) claim 1 further comprising an at least one affixable divider (275) for dividing the inner compartment (240) into a plurality of inner compartments.

9. The floorboard storage compartment (100) of claim 1 wherein the upper tray (150) further comprises a hinge line (185) between an upper tray left edge (165) and an upper tray right upper edge (170).

10. The floorboard storage compartment (100) of claim 1 wherein the upper tray front side (115) further comprises an upper tray front side terminal edge (195) configured to terminate parallel with the lower tray front side terminal edge (160).

11. The floorboard storage compartment (100) of claim 1 wherein the upper tray outer surface (180) comprises a vinyl polymer.

12. The floorboard storage compartment (100) of claim 1 wherein the upper tray (150) further comprises an upper tray stiff support material (305).

13. The floorboard storage compartment (100) of claim 12 wherein the upper tray stiff support material (305) provides stiffness to the upper tray (150) and is capable of supporting at least 15 pounds.

14. The floorboard storage compartment (100) of claim 1 wherein the upper tray (150) comprises an upper tray inner surface (235) comprising a plurality of side-by-side ridges (280) and positioned between one-half inch and four inches from the upper tray back edge (175).

15. The floorboard storage compartment (100) of claim 1 further comprising an at least two magnets (290) affixed to an upper tray inner surface (235) at the upper tray back edge (175) configured to magnetically couple to an at least two magnets (290) affixed to the lower tray inner bottom surface (245) at the lower tray back edge (125) to secure closure of the upper tray (150) to the lower tray (105).

16. The floorboard storage compartment (100) of claim 1 wherein the upper tray back edge (175) extends to within one inch of the floorboard rear side (E) bordered by a passenger seat.

17. The floorboard storage compartment (100) of claim 1 further comprising an at least one floorboard affixment port (295) to affix the floorboard storage compartment (100) to the floorboard basin (A).

18. The floorboard storage compartment (100) of claim 1 wherein the lower tray bottom outer surface (110) comprises a waterproof and wear resistant material (205).

19. The floorboard storage compartment (100) of claim 1 wherein the upper tray outer surface (180) comprises a waterproof and wear resistant material (205).

20. The floorboard storage compartment (100) of claim 1 wherein the a lower tray left side (130), a lower tray right side (145), an upper tray left side (165), and an upper tray right side (170) comprise a curved lateral profile.

21. The floorboard storage compartment (100) of claim 1 wherein the lower tray front side height (FSH) comprises at least two inches but less than six inches.

22. The floorboard storage compartment (100) of claim 1 wherein the lower tray left side height (LSH) at the lower tray front side (115) comprises at least one inch but less than five inches.

23. The floorboard storage compartment (100) of claim 1 wherein the an at least one separation support (230) supports and separates the upper tray (150) at a distance of at least one-half inch but not more than five inches above the lower tray inner bottom surface (245).

24. The floorboard storage compartment (100) of claim 1 wherein the lower tray left side (130) is configured to align along the floorboard left side (B) and comprising a lateral profile to lie parallel to a transmission hump adjacent to the floorboard left side (B).

25. The floorboard storage compartment (100) of claim 6 wherein the vibration absorbing material (265) comprising a compressible material formed into a matrix of padded squares arranged in a square grid pattern (270) on the lower tray inner bottom surface (245) is configured for use with an at least one separation support (230) having a portion cut-out along bottom edges of the at least one separation support (230) for fitting over the matrix of padded squares arranged in a square grid pattern (270) within an inner compartment (240).

* * * * *